(12) United States Patent
Neault

(10) Patent No.: US 7,163,252 B1
(45) Date of Patent: Jan. 16, 2007

(54) SOLAR SHIELD SUN VISOR

(76) Inventor: Charles Carey Neault, 38266 Member's Club Dr., Murrietta, CA (US) 92563

( * ) Notice: Subject to any disclaimer, the term of this patent is extended or adjusted under 35 U.S.C. 154(b) by 0 days.

(21) Appl. No.: 11/371,576

(22) Filed: Mar. 9, 2006

(51) Int. Cl.
*B60J 3/00* (2006.01)
(52) U.S. Cl. ..................................... 296/97.7
(58) Field of Classification Search ............... 296/97.7, 296/97.1, 97.2
See application file for complete search history.

(56) References Cited

U.S. PATENT DOCUMENTS

| | | | |
|---|---|---|---|
| 2,033,371 A | 3/1936 | Muench | |
| 2,163,495 A | 6/1939 | Levy | |
| 2,549,395 A | 4/1951 | Short | |
| 2,620,222 A | 12/1952 | Beauchamp | |
| 4,172,613 A | 10/1979 | Furando | |
| 4,958,879 A | 9/1990 | Gillum | |
| 5,165,462 A * | 11/1992 | Kang | 160/370.21 |
| 5,261,717 A | 11/1993 | Tsumura et al. | |
| 5,494,328 A | 2/1996 | Lehr | |
| 5,829,507 A * | 11/1998 | Pawlowski | 160/368.1 |
| 5,979,967 A | 11/1999 | Poulson | |
| 6,682,122 B1 | 1/2004 | Prokhorov | |
| 7,014,244 B1 * | 3/2006 | Baldwin | 296/97.9 |
| 2002/0135197 A1 * | 9/2002 | Howard | 296/97.7 |

FOREIGN PATENT DOCUMENTS

DE 10041637 3/2002
GB 999.331 7/1965

* cited by examiner

*Primary Examiner*—H Gutman
(74) *Attorney, Agent, or Firm*—Michael I. Kroll

(57) ABSTRACT

A sun glare shield device includes a shaped member for reducing glare associated with the sun for reducing glare associated with the sun and means for attaching the member to at least one of a windshield of a vehicle and a rear view mirror of a vehicle. The member obstructs spaces between a vehicle visor and the rear view mirror and prevents sun glare from passing through the spaces.

9 Claims, 15 Drawing Sheets

SOLAR SHIELD SUN VISOR

BACKGROUND OF THE INVENTION

1. Field of the Invention

The present invention relates generally to visors and, more specifically, to visor that is affixed to a vehicle's windshield for reducing glare from the sun. Sun glare on windshields of motor vehicles causes visual impairment to the driver. The sun glare shield of the present invention is affixed to the windshield's upper center section between the vehicle's sun visors. The sun glare shield of the present invention further allows the user to custom fit the sun glare shield around the mounting support of the rear view mirror.

2. Description of the Prior Art

There are other devices designed for shielding the sun. Typical of these is U.S. Pat. No. 2,033,391 issued to Costello, Henry O. on Mar. 10, 1936 and U.S. Pat. No. 2,163,495 issued to Solomon, M. Levy on Jun. 20, 1939.

Another patent was issued to Short, Charles A on Apr. 17, 1951 as U.S. Pat. No. 2,549,395. Yet another U.S. Pat. No. 2,620,222 was issued to Beauchamp, Mary E. on Dec. 2, 1952 and still yet another was issued on Oct. 30, 1979 to Furando, Joseph V. as U.S. Pat. No. 4,172,613.

Another patent was issued to Gillum, Julius H. on Sep. 25, 1990 as U.S. Pat. No. 4,958,879. Yet another U.S. Pat. No. 5,261,717 was issued to Tsumura, Toshihiro on Nov. 16, 1993. Another was issued to Lehr, Jaroslaw J on Feb. 27, 1996 as U.S. Pat. No. 5,494,328.

Still yet another was issued on Nov. 9, 1999 to Poulson, Thomas C. as U.S. Pat. No. 5,979,967. Another patent was issued to Prokhorov Danil V. on Jan. 27, 2004 as U.S. Pat. No. 6,682,122.

Internationally, a U.K patent was issued to Happich on Jul. 21, 1965 as Patent No. GB999,331. Yet another German Patent No. DE10041637 was issued to Scholz, Eckhard on Mar. 7, 2002.

U.S. Pat. No. 2,033,391

Inventor: Henry O. Costello

Issued: Mar. 10, 1936

This invention relates to a border shade for rear view mirrors for vehicles. An object of this invention is to provide a device which will screen light rays about the edge of a rear view mirror and which will frame such a mirror in such a manner as to enhance the view obtained through it. Another object of the invention is to provide means simple in construction and economical to manufacture, for attaching such a shield to a rear view mirror.

U.S. Pat. No. 2,163,495

Inventor: Solomon, M. Levy

Issued: Jun. 20, 1939

This invention relates to improvements in sun visors for automobiles. An important object of the invention is to provide a sun visor, for automobiles which is capable of as wide a range of adjustment as that possible by the use of a ball and socket joint, thus making it possible not only to turn the visor about an axis extending through it, but also to move it bodily through a plurality of different planes, this being done in such a manner as to obstruct sun glare in an area which heretofore has remained unshielded.

U.S. Pat. No. 2,549,395

Inventor: Short, Charles A.

Issued: Apr. 17, 1951

This invention relates to a novel auxiliary sunvisor to bridge the gap between the two sun visors—usually found in modern automobiles, trucks and other vehicles.

U.S. Pat. No. 2,620,222

Inventor: Beauchamp, Mary E.

Issued: Dec. 2, 1952

The present invention relates to an auxiliary glare shield for automobiles, and more particularly to a glare shield which is adapted to be selectively mounted either between the conventional visors of a motor vehicle so that it will not interfere with the driver's use of the rear view mirror, or to be inoperatively mounted in a manner to permit ready access thereof when needed.

U.S. Pat. No. 4,172,613

Inventor: Furando, Joseph V

Issued: Oct. 30, 1979

A universal glare shield for attachment to the windshield of an automobile comprises a flexible panel which has breakaway marginal portions. Additional portions of the panel are adapted to be broken away to form a slot opening through one edge of the panel for receiving a rearview mirror mounting post which projects from the windshield. Suction cups or strips of adhesive secured to the panel facilitate attachment to the windshield surface.

U.S. Pat. No. 4,958,879

Inventor: Gillum, Julius H

Issued: Sep. 25, 1990

Disclosed is a portable, compact sun visor adapted to be placed over the rearview mirror of an automotive vehicle. The visor comprises a generally rectangular member which is opaque and had dimensions which block sunlight from directly striking the driver in the eyes as the sun enters the windshield in the area surrounding the rear view mirror. The member is opaque and has a slot and hinge disposed along the central latitudinal axis of the member, enabling the member to be folded about the hinge and divided into two sections which are mirror images of each other. When unfolded and placed over the arm of the rearview mirror, the sun visor is balanced and blocks light entering the windshield in the vicinity of the rearview mirror.

U.S. Pat. No. 5,261,717

Inventor: Tsumura, Toshihiro

Issued: Nov. 16, 1993

An apparatus for preventing the driver of a vehicle from being blinded by the glare of light by selectively moving a light-shielding plate in two-dimensions along an inside surface of the windshield to provide a light-shielding region. The light-shielding plate is controllably moved by hand or by motor. More preferably, the apparatus further includes a microcomputer for obtaining the crossing point between light coming into the eye of the driver and the windshield plate, and a mechanism or circuit for moving the light-shielding plate to a shielding position defined by the microcomputer.

U.S. Pat. No. 5,494,328

Inventor: Lehr, Jaroslaw J

Issued: Feb. 27, 1996

A glare shield that fits between the sun visors on an automobile having the top edge secured by clips glued to the windshield, or secured beneath the trim near the roof of the automobile, and having the bottom edge secured by a suction cup.

U.S. Pat. No. 5,979,967

Inventor: Poulson, Thomas C

Issued: Nov. 9, 1999

An auxiliary sun visor is in the form of an oblong panel which is placed in front of a rear view mirror to bridge the space between the standard sun visors of a motor vehicle, and complementary fastening members on one surface of the panel and the front surface of the rear view mirror to releasably attach the panel to the rear view mirror.

U.S. Pat. No. 6,682,122

Inventor: Prokhorov Danil V

Issued: Jan. 27, 2004

A sun visor system for a vision unit of an automotive vehicle includes a sliding carrier visor having a stowed position within a headliner of a vehicle and a deployed position running laterally along a portion of the vision unit between a rearview mirror mounted to the vision unit and the headliner. Laterally extending insert visors may be independently deployed from the carrier visor so as to increase the area of a vision unit, such as a windshield, being protected from glare by the present visor system.

U.K. Patent Number GB999,331

Inventor: Happich

Issued: Jul. 21, 1965

A vehicle sun visor comprises a body 1, FIG. 1, of sheet synthetic plastic having between its walls, FIG. 2, two cushion sheets, one on each side of an outer wire frame, a wire sub-frame, being disposed within the outer frame to support the central part of the visor and the two frames being formed from a single length of wire. The outer frame is formed with shoulders which are abutted and welded, at to the side of the sub-frame the latter also being spaced from the side of the outer frame by a shoulder. The free end of the subframe is secured to the side. Fixing lugs are mounted at each end of the side by means of sleeves the lugs having parts for fastening to the interior of the vehicle. Hinge pins formed on the lugs enter the sleeves and frictional grip therebetween is adjusted by set screws. According to an embodiment described with reference to FIGS. 3 and 4 a mirror is secured in the wall in known manner by means of a small frame.

Germany Patent Number DE10041637

Inventor: Scholz, Eckhard

Issued: Mar. 7, 2002

The sun visor has a mirror on one side, acting as a rear view mirror.

SUMMARY OF THE PRESENT INVENTION

The present invention relates generally to sun visors and, more specifically, to a visor affixed to a vehicle's windshield for reducing the glare associated with the sun. Sun glare on windshields of motor vehicles causes visual impairment to the driver. The sun glare shield of the present invention is affixed to the windshield's upper center section between the vehicle's sun visors. The sun glare shield of the present invention further allows the user to custom fit the sun glare shield around the mounting support of the rear view mirror.

A primary object of the present invention is to provide a sun glare shield that overcomes the shortcomings of the prior art.

Another, secondary object of the present invention is to provide a sun glare shield in a vehicle that is attached to the vehicle windshield.

Another object of the present invention is to provide a sun glare shield that reduces sun glare for the occupants of the vehicle.

Still another object of the present invention is to provide a sun glare shield that is affixed to an upper center section of the windshield between the fold down visors of the vehicle.

Yet another object of the present invention is to provide a sun glare shield that can accommodate a rear view mirror.

Yet still another object of the present invention is to provide a sun glare shield that is free of apertures, perforations and markings.

Another object of the present invention is to provide a sun glare shield wherein the visor is cut and custom fit for mounting the solar shield around the support of the rear view mirror.

Yet another object of the present invention is to provide a sun glare shield that includes horizontal and vertical markings centrally located from both left to right and top to bottom.

Still yet another object of the present invention is to provide a sun glare shield wherein the horizontal and vertical markings allow the user to cut and custom fit the solar shield about the mounting support of the rear view mirror.

Another object of the present invention is to provide a sun glare shield that is simple and easy to use.

Yet another object of the present invention is to provide a sun glare shield that is inexpensive to manufacture and operate.

Additional objects of the present invention will appear as the description proceeds.

The present invention overcomes the shortcomings of the prior art by providing a sun glare shield that is opaque. The sun glare shield attaches to the upper center section of the windshield between the vehicles sun visors by static electricity. The sun glare shield of the present invention prevents the sun glare from entering the vehicle through the space between the rear view mirror and the fold down sun visors. The sun glare shield of the present invention can be custom fit around a rear view mirror that is mounted to the windshield. The sun glare shield of the present invention may be utilized in it's simplest form or customized to suit individual applications.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
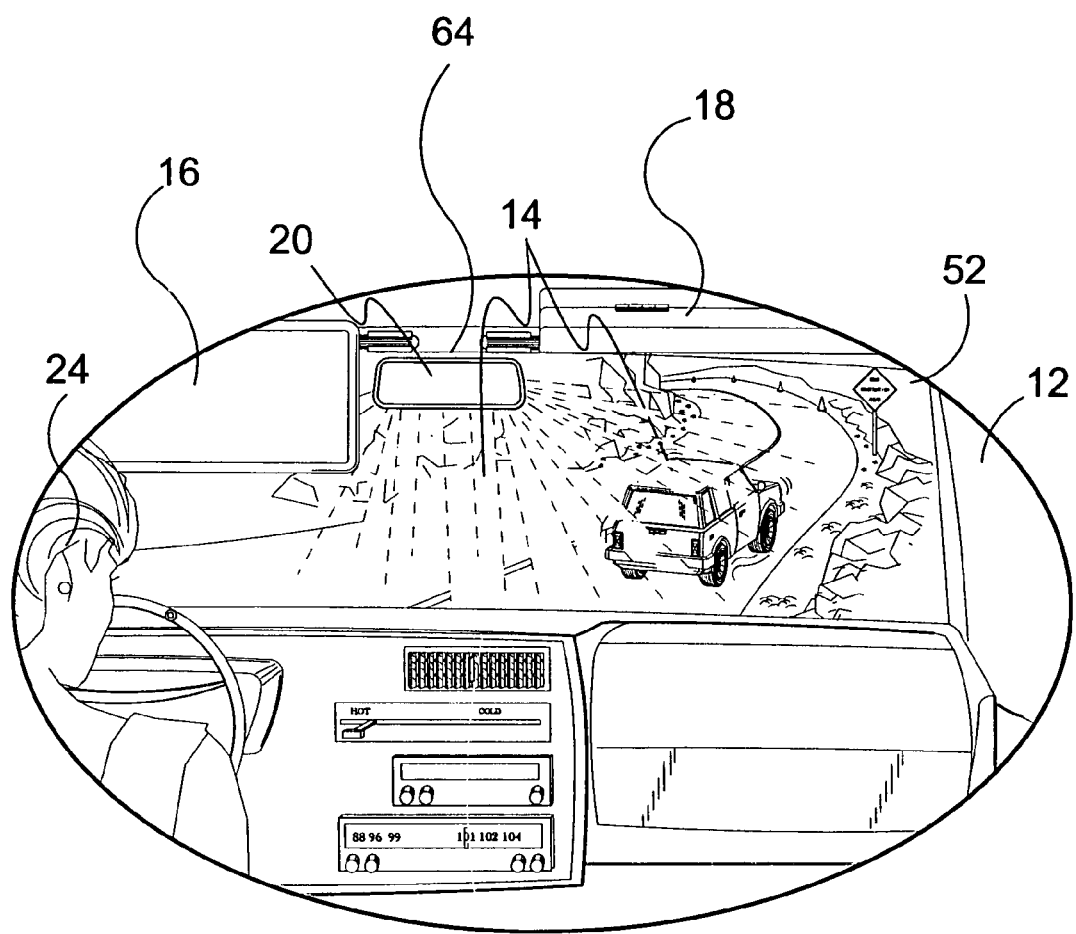
FIG. 1 is an illustrative view of prior art.

Turning now descriptively to the drawings, in which similar reference characters denote similar elements throughout the several views, the Figures illustrate the sun glare shield of the present invention. With regard to the reference numerals used, the following numbering is used throughout the various drawing Figures.

10 Sun visor of the present invention
12 vehicle
14 sun glare
16 driver side fold down visor
18 passenger side fold down visor
20 rear view mirror
22 rear view mirror mount
24 user
26 attachment device
28 left side of shield
30 right side of shield
32 top side of shield
34 bottom side of shield
36 front side of shield
38 back side of shield
40 vertical line
42 overhead mirror mount
44 cutting means
46 user defined cut template
48 pre-marked grid
50 mirror aperture
52 windshield
54 left side of grid
56 right side of grid
58 top side of grid
60 bottom side of grid
62 grid marker
64 top of windshield
66 predefined template
68 grid lines
70 grid line numbers
72 top half grid
74 bottom half grid
76 grid measuring device

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 15 illustrate a sun glare shield of the present invention which is indicated generally by the reference numeral 10.

FIG. 1 is an illustrative view of the prior art showing the problem that the present invention is intended to solve. A driver side fold down visor 16 is attached to the vehicle 12 above a top 64 of the windshield 52 on the driver's side of the vehicle 12. A passenger side fold down visor 18 is attached to the vehicle 12 above the top 64 of the windshield 52 on the passenger's side of the vehicle 12. When in the folded down position, the driver side fold down visor 16 and the passenger side fold down visor 18 prevent sun glare 14 directly in the field of vision of the driver and passenger, respectively, from impeding their vision. A rear view mirror 20 is attached via a rear view mirror mount 22, described hereinafter with specific reference to FIG. 6, to the windshield 52. The rear view mirror 20 is centrally located between the driver side fold down visor 16 and the passenger side fold down visor 18. The sides of the rear view mirror 20 are not flush against the sides of the driver side fold down visor 16 and the passenger side fold down visor 18, thus allowing a glare from the sun 14 to enter the vehicle 12. The sun glare 14 that enters the vehicle 12 impedes a user's 24 ability to see the road clearly, thereby increasing the dangers involved in driving the vehicle 12.

Figure 2:
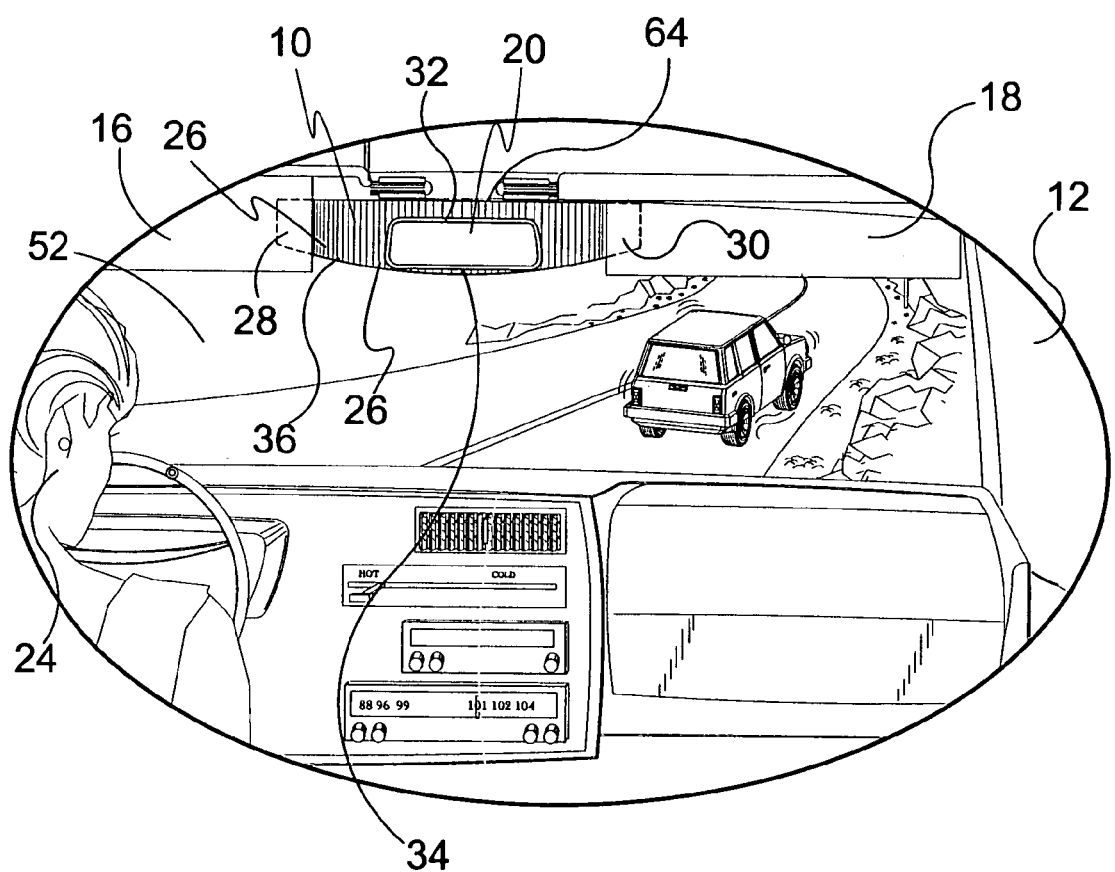
FIG. 2 is an illustrative view of the sun glare shield of the present invention in use.

FIG. 2 is an illustrative view of the sun glare shield 10 of the present invention in use. The sun glare shield 10 has a left 28, right 30, top 32, bottom 34, front 36 and back side 38. The sun glare shield 10 is made from a material, including but not limited to a vinyl, that prevents sun glare 14 from passing therethrough. Shown herein and throughout the description of the Figures, the material is opaque and completely prevents light from passing therethrough. However, in an alternate embodiment, the sun glare shield 10 includes perforations that permit the user 24 to see through the sun glare shield 10 while at the same time keeping the sun glare 14 from entering the vehicle 12.

As discussed hereinabove with specific reference to FIG. 1, the vehicle 12 has the driver side fold down visor 16 attached to the vehicle 12 above the top 64 of the windshield 52 on the driver's side of the vehicle 12. The passenger side fold down visor 18 is attached to the vehicle 12 above the top 64 of the windshield 52 on the passenger's side of the vehicle 12. The rear view mirror 20 is attached via the rear view mirror mount 22, described hereinafter with specific reference to FIG. 6, to the windshield 52 proximate to the top 64 of the windshield 52. The rear view mirror 20 is centrally located between the driver side fold down visor 16 and the passenger side fold down visor 18. The sides of the rear view mirror 20 are not flush against the sides of the driver side fold down visor 16 and the passenger side fold down visor 18.

The sun glare shield 10 is attached to the windshield 52 by an attachment device 26. The attachment device 26 include but are not limited to static electricity, suction cups, adhesive tape and hook and loop tape. The sun glare shield 10 is positioned on the windshield 52 so that the top side 32 of the shield 10 is flush against the top 64 of the windshield 52 and the front side 36 faces the interior of the vehicle 12. The sun glare shield 10 is also positioned on the windshield 52 so that the space on the windshield 52 between the driver side fold down visor 16 and the rear view mirror 20, when the driver side fold down visor 16 is in the folded down position, is covered by the sun glare shield 10; the space on the windshield 52 between the passenger side fold down visor 18 and the rear view mirror 20, when the passenger side fold down visor 18 is in the folded down position, is covered by the sun glare shield 10; the space on the windshield 52 between the rear view mirror 20 and the top 64 of the windshield is covered by the sun glare shield 10; and the space on the windshield 52 below the rear view mirror 20 and between the driver side 16 and passenger side 18 fold down visor is covered by the sun glare shield 10.

Herein, the user 24 is driving the vehicle 12. Both the driver side 16 and the passenger side 18 fold down visors are in the folded down position. The sun glare shield 10 is attached to the windshield 52 so that the windshield 52 between the driver side 16 and the passenger side 18 fold down visors is not visible to the user 24, while at the same time allowing the user 24 to continue using the rear view mirror 20. The blocked windshield 52 prevents unwanted sun glare from entering the vehicle and impeding the user's 24 line of vision thereby causing dangerous driving conditions.

Figure 3:
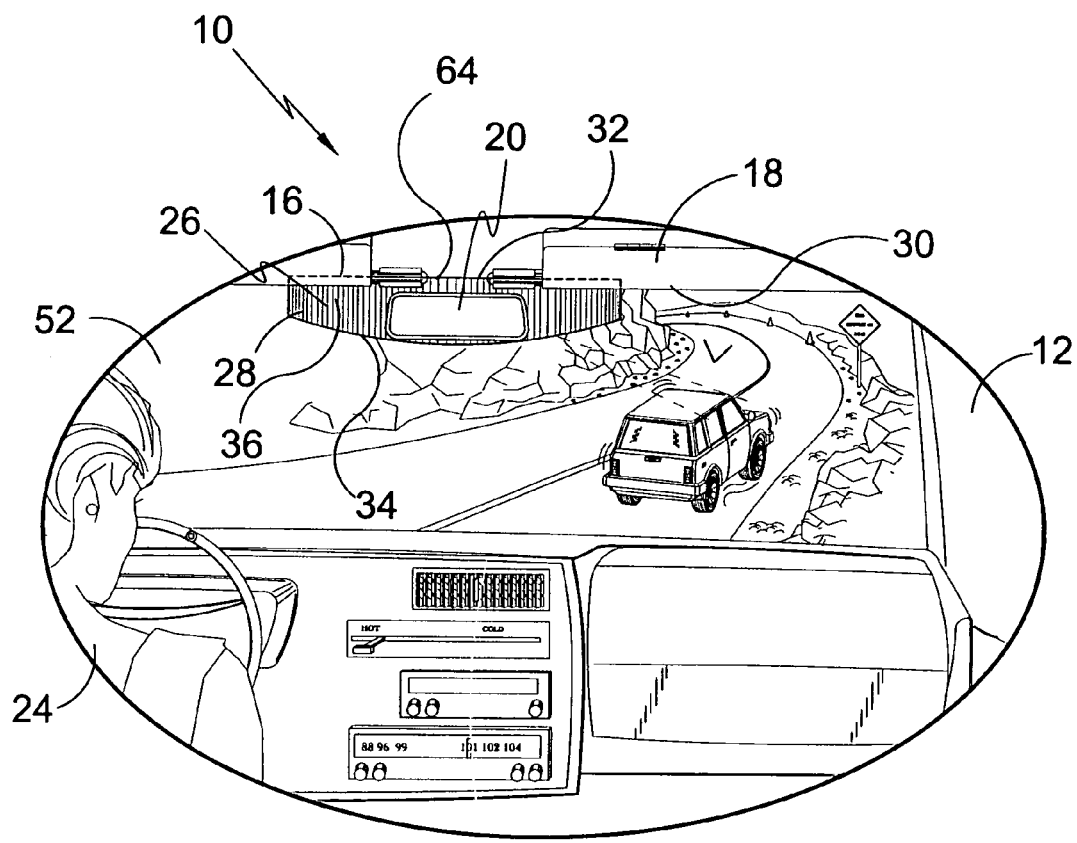
FIG. 3 is an illustrative view of the sun glare shield of the present invention in use.

FIG. 3 is an illustrative view of the sun glare shield 10 of the present invention in use. The sun glare shield 10 includes the left 28, right 30, top 32, bottom 34, front 36 and back side 38. As discussed hereinabove with specific reference to FIG. 1, the vehicle 12 has the driver side fold down visor 16 attached to the vehicle 12 above the top 64 of the windshield 52 on the driver's side of the vehicle 12. The passenger side fold down visor 18 is attached to the vehicle 12 above the top 64 of the windshield 52 on the passenger's side of the vehicle 12. The rear view mirror 20 is attached via the rear view mirror mount 22, described hereinafter with specific reference to FIG. 6, to the windshield 52 proximate to the top 64 of the windshield 52. The rear view mirror 20 is centrally located between the driver side fold down visor 16 and the passenger side fold down visor 18. The sides of the rear view mirror 20 are not flush against the sides of the driver side fold down visor 16 and the passenger side fold down visor 18.

The sun glare shield 10 is attached to the windshield 52 by the attachment device 26. The sun glare shield 10 is positioned on the windshield 52 so that the top side 32 of the shield 10 is flush against the top 64 of the windshield 52 and the front side 36 faces the interior of the vehicle 12. The sun glare shield 10 is also positioned on the windshield 52 so that the space on the windshield 52 between the driver side fold down visor 16 and the rear view mirror 20, when the driver side fold down visor 16 is in the folded down position, is covered by the sun glare shield 10; the space on the windshield 52 between the passenger side fold down visor 18 and the rear view mirror 20, when the passenger side fold down visor 18 is in the folded down position, is covered by the sun glare shield 10; the space on the windshield 52 between the rear view mirror 20 and the top 64 of the windshield is covered by the sun glare shield 10; and the space on the windshield 52 below the rear view mirror 20 and between the driver side 16 and passenger side 18 fold down visor is covered by the sun glare shield 10.

Herein, the user 24 is driving the vehicle 12. Both the driver side 16 and the passenger side 18 fold down visors are in the folded up position. Although the driver side 16 and the passenger side 18 fold down visors are in the folded up position, the sun glare shield 10 remains attached to the windshield 52 so that the windshield 52 between the driver side 16 and the passenger side 18 fold down visors, when both 16 and 18 are folded down, is not visible to the user 24, while at the same time allowing the driver to continue using the rear view mirror 20. The blocked windshield 52 prevents unwanted sun glare from entering the vehicle and impeding the user's 24 line of vision thereby causing dangerous driving conditions. Herein, there is no unwanted sun glare. However, the sun glare shield 10 does not need to be removed as it does not impede the user's 24 view of the road ahead.

Figure 4:
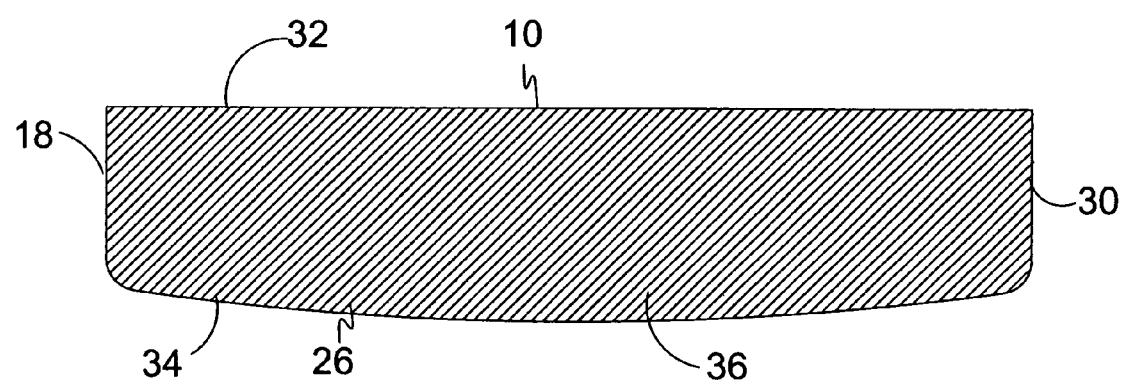
FIG. 4 is a front view of sun glare shield of the present invention.

FIG. 4 is a perspective view of the front of the sun glare shield 10 of the present invention. The sun glare shield 10 includes the left 28, right 30, top 32, bottom 34, front 36 and back side 38. The sun glare shield 10 is made from an opaque material, including but not limited to a vinyl, that prevents sun glare 14 from passing therethrough. As discussed hereinabove with specific reference to FIG. 2, in an alternate embodiment, the sun glare shield 10 can be made from a material like a mesh, it can be polarized or it can be optically coated. This would enable the user 24 to see through the sun glare shield 10 while at the same time keeping the sun glare 14 from entering the vehicle 12. Material that is both polarized and optically coated would cause less distortion than a mesh material. Additionally, there are different grades of optical coatings that affect the quality of the glare reduction.

Figure 5:
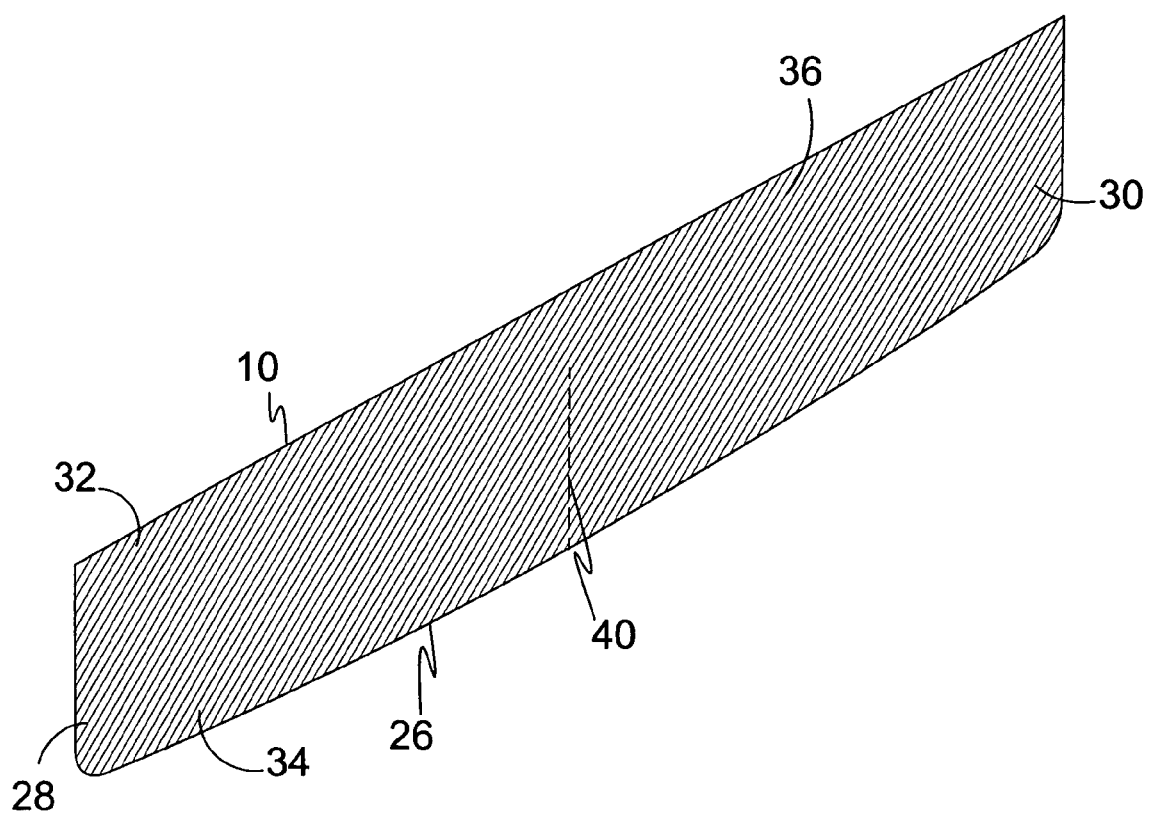
FIG. 5 is a perspective view of the sun glare shield of the present invention.

FIG. 5 is a perspective view of the sun glare shield 10 of the present invention. The sun glare shield 10 includes the left 28, right 30, top 32, bottom 34, front 36 and back side 38. The sun glare shield 10 is made from an opaque material, including but not limited to a vinyl, that prevents sun glare 14 from passing therethrough. A vertical line 40 is centrally located on the front 36 of the sun glare shield 10. The vertical line 40 extends from the bottom 34 of the sun glare shield 10 to a location proximate to the top 32 of the sun glare shield 10. The vertical line 40 can be one of printed onto the surface of the front 36 of the sun glare shield 10 or can be partially embedded within the surface of the front 36 of the sun glare shield 10. In an alternate embodiment, the vertical line 40 can be located solely on or within the surface of the back 38 of the sun glare shield 10. In another alternate embodiment, the vertical line 40 can be located on or within both the surface of the front 36 and the back 38 of the sun glare shield 10.

Figure 6:
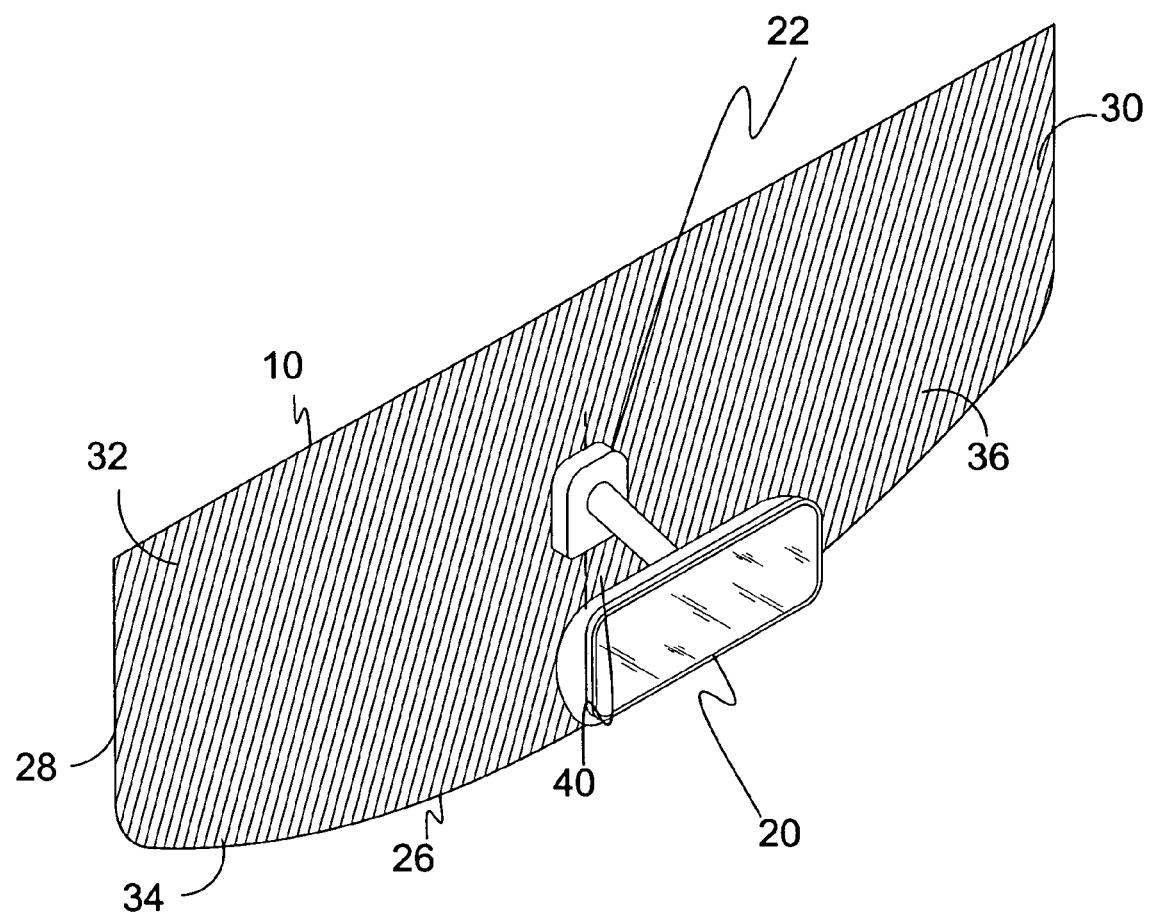
FIG. 6 is an illustrative view of the sun glare shield of the present invention in use

The vertical line 40 enables the user 24 to center the sun glare shield 10 about the rear view mirror mount 22, shown in FIG. 6. The user 24 is then able to custom fit the sun glare shield 10 about the rear view mirror mount 22 as will be discussed hereinafter with specific reference to FIG. 8.

FIG. 6 is an illustrative view of the sun glare shield 10 in use. The sun glare shield 10 includes the left 28, right 30, top 32, bottom 34, front 36 and back side 38. The sun glare shield 10 is made from an opaque material, including but not limited to a vinyl, that prevents sun glare 14 from passing therethrough. The vertical line 40 is centrally located on the front 36 of the sun glare shield 10. The vertical line 40 extends from the bottom 34 of the sun glare shield 10 to a location proximate to the top 32 of the sun glare shield 10.

The vertical line 40 enables the user 24 to center the sun glare shield 10 about the rear view mirror mount 22. Herein the user 24 custom fit the sun glare shield 10 about the rear view mirror mount 22, as will be discussed hereinafter with specific reference to FIG. 8. When the sun glare shield 10 is customized to fit around the rear view mirror mount 22, no sun glare 14 enters the vehicle 12 and the user 24 is still able to use the rear view mirror 20.

Figure 7:
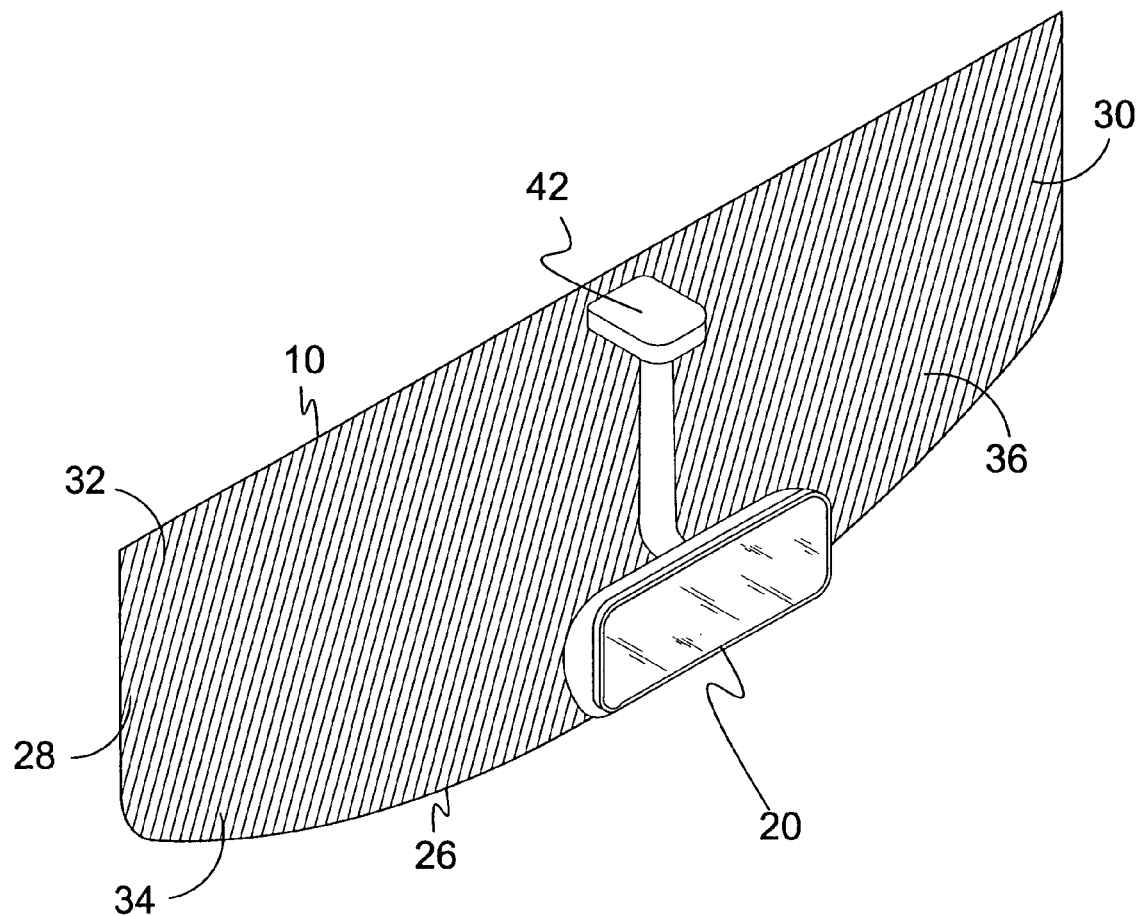
FIG. 7 is a perspective view of the sun glare shield of the present invention in use.

FIG. 7 is an illustrative view of the sun glare shield 10 of the present invention. The sun glare shield 10 includes the left 28, right 30, top 32, bottom 34, front 36 and back side 38. The sun glare shield 10 is made from an opaque material, including but not limited to a vinyl, that prevents sun glare 14 from passing therethrough. The vertical line 40 is centrally located on the front 36 of the sun glare shield 10. The vertical line 40 extends from the bottom 34 of the sun glare shield 10 to a location proximate to the top 32 of the sun glare shield 10.

The vertical line 40 enables the user 24 to center the sun glare shield 10 about the rear view mirror mount 22. Shown herein the rear view mirror 20 is attached to the vehicle 12 by an overhead mirror mount 42. The overhead mirror mount 42 is attached to the roof of the vehicle 12. When the overhead mirror mount 42 is used, the sun glare shield 10 can just be attached to the windshield 52 without any customization or alterations to fit around the overhead mirror mount 42.

Figure 8:
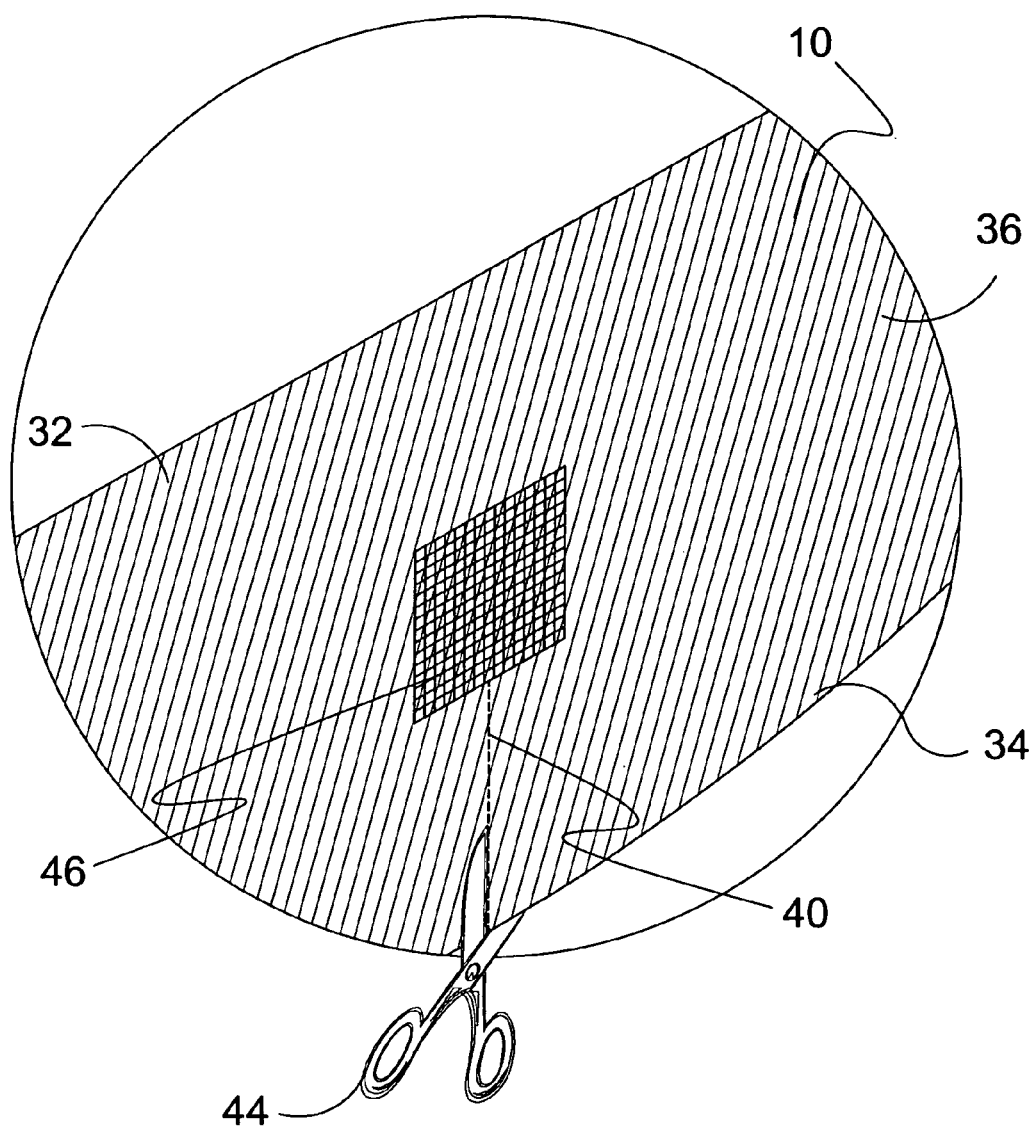
FIG. 8 is an illustrative view of the sun glare shield of the present invention being prepared for use.

FIG. 8 is an illustrative view of the sun glare shield 10 of the present invention being prepared for use. Herein, the sun glare shield 10 is being customized to fit around the rear view mirror mount 22. The sun glare shield 10 includes the left 28, right 30, top 32, bottom 34, front 36 and back side 38. The sun glare shield 10 is made from an opaque material, including but not limited to a vinyl, that prevents sun glare 14 from passing therethrough. The vertical line 40 is centrally located on the front 36 of the sun glare shield 10. The vertical line 40 extends from the bottom 34 of the sun glare shield 10 to a location proximate to the top 32 of the sun glare shield 10.

The vertical line 40 enables the user 24 to center the sun glare shield 10 about the rear view mirror mount 22. Shown herein, the user 24 created a user defined cut template 46 vertically centered about the vertical line 40. To create the user defined cut template 46, the user 24 measures the height and width of the rear view mirror mount 22 to determine how big of a mirror aperture 50 to cut from the sun glare shield 10. The user also measures the distance from the top 32 of the sun glare shield 10 to the top of the rear view mirror mount 22 when the top 32 of the sun glare shield 10 is flush against the top 64 of the windshield 52, to determine where the top of the mirror aperture 50 should be. After creating the user defined cut template 46, the user uses a cutting means 44 to create the mirror aperture 50. Shown herein, the cutting means 44 is a scissor. However, the cutting means 44 can be any object able to cut the sun glare shield 10 to create the mirror aperture 50.

Figure 9:
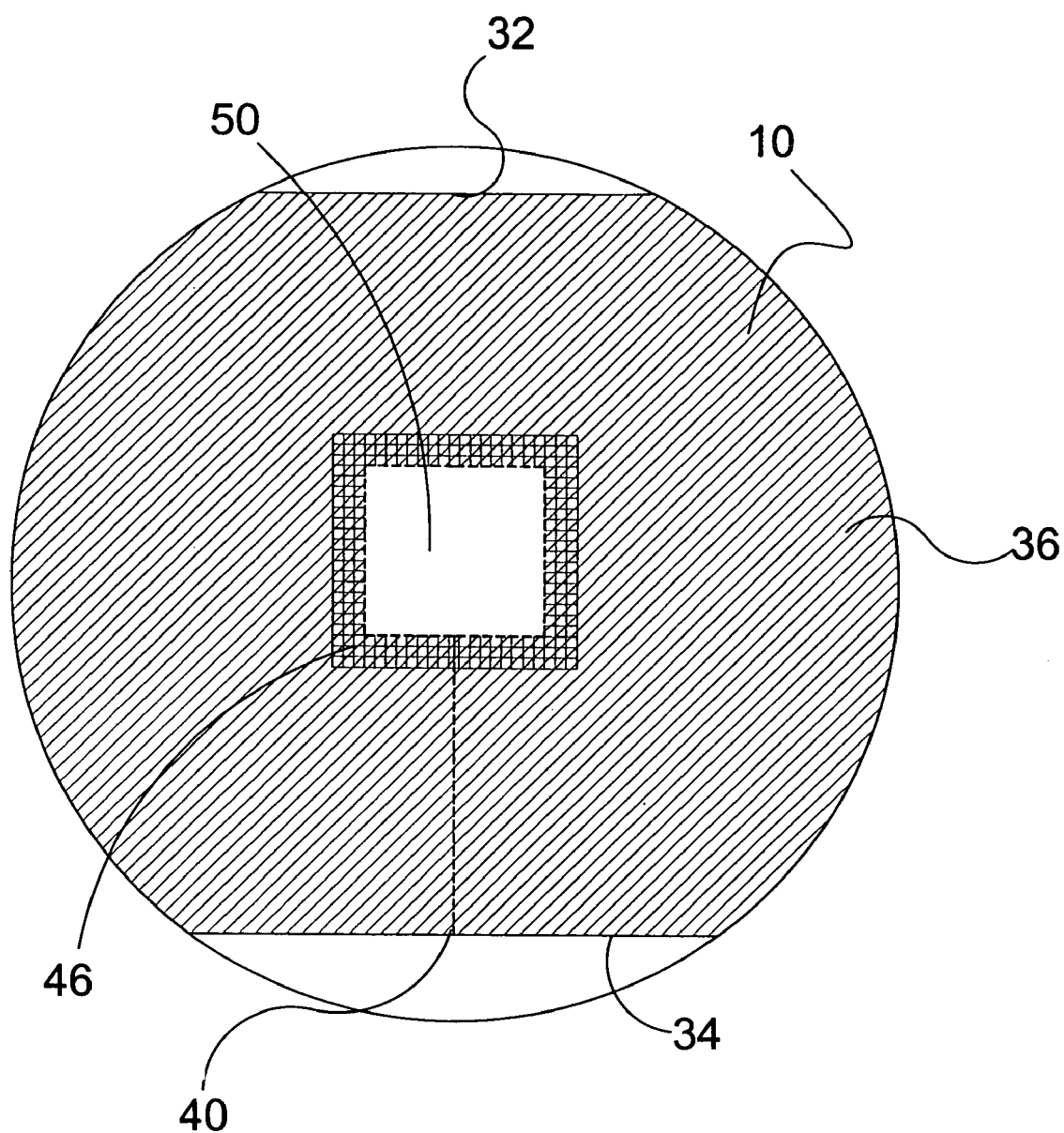
FIG. 9 is a perspective view of the mirror aperture of the sun glare shield of the present invention.

FIG. 9 is a perspective view of the mirror aperture 50 in the sun glare shield 10 of the present invention. Herein, the sun glare shield 10 has being customized to fit around the rear view mirror mount 22. The sun glare shield 10 includes the left 28, right 30, top 32, bottom 34, front 36 and back side 38. The sun glare shield 10 is made from an opaque material, including but not limited to a vinyl, that prevents sun glare 14 from passing therethrough. The vertical line 40 is centrally located on the front 36 of the sun glare shield 10. The vertical line 40 extends from the bottom 34 of the sun glare shield 10 to a location proximate to the top 32 of the sun glare shield 10.

The vertical line 40 enabled the user 24 to center the sun glare shield 10 about the rear view mirror mount 22. Shown herein, the user 24 created the mirror aperture 50 from the user defined cut template 46, shown in FIG. 8. The mirror aperture 50 was created so that it was vertically centered about the vertical line 40. The creation of the mirror aperture 50 is not limited to the method described hereinabove with specific reference to FIG. 8, and any method to create the mirror aperture 50 could be used. The mirror aperture 50 permits the sun glare shield 10 to be custom fit around the rear view mirror mount 22 and still prevent sun glare 14 from entering the vehicle 12. After customization, the sun glare shield 10 is attached to the windshield 52 by the attachment device 26.

Figure 10:
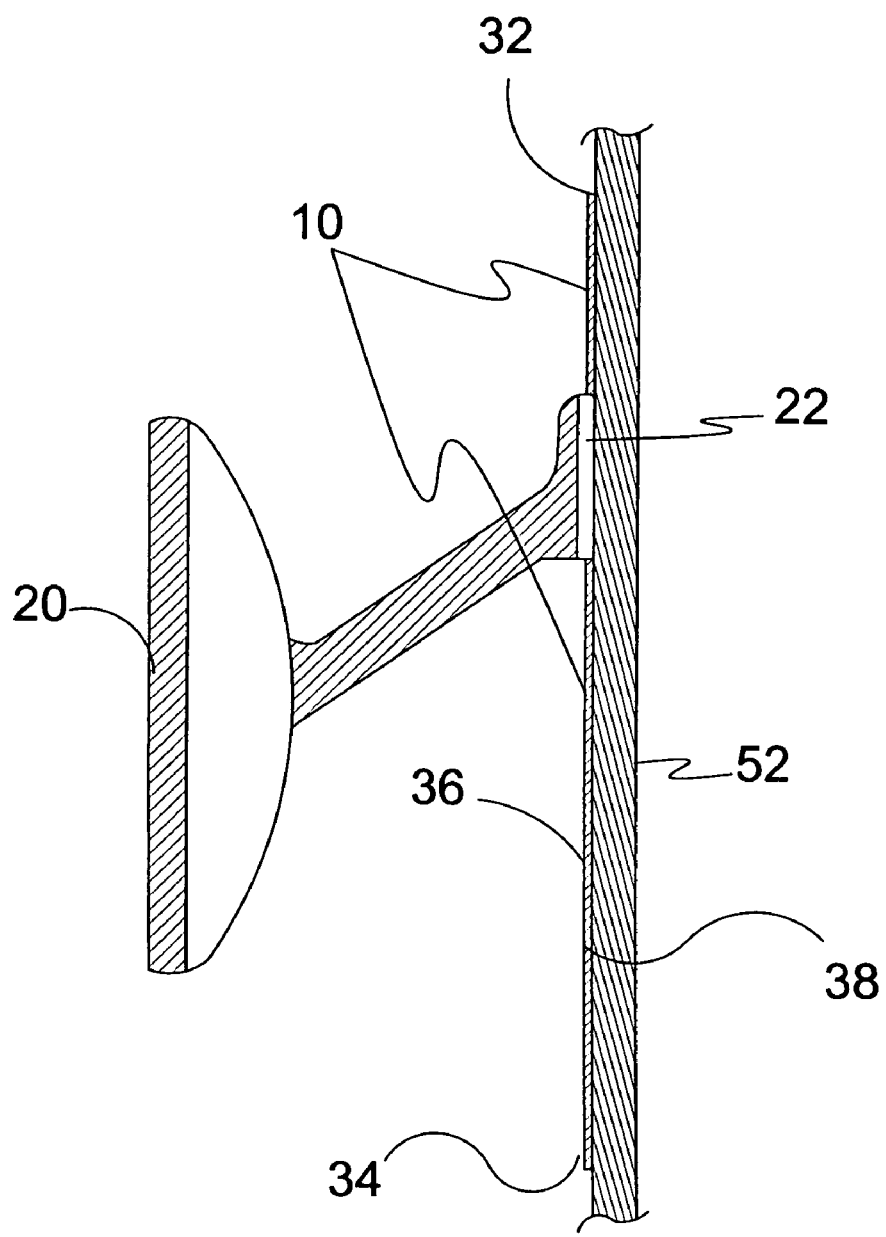
FIG. 10 is a sectional view of the sun glare shield of the present invention in use.

FIG. 10 is a sectional view of the sun glare shield 10 of the present invention. Herein, the sun glare shield 10 has being customized to fit around the rear view mirror mount 22. The sun glare shield 10 includes the left 28, right 30, top 32, bottom 34, front 36 and back side 38. The sun glare shield 10 is made from an opaque material, including but not limited to a vinyl, that prevents sun glare 14 from passing therethrough. The vertical line 40, shown in FIG. 9, is centrally located on the front 36 of the sun glare shield 10. The vertical line 40 extends from the bottom 34 of the sun glare shield 10 to a location proximate to the top 32 of the sun glare shield 10. The vertical line 40 enabled the user 24 to center the sun glare shield 10 about the rear view mirror mount 22 and create the user defined cut template 46. From the user defined cut template 46, the user 24 was able to make the mirror aperture 50 so that the sun glare shield 10 could be customized to fit around the rear view mirror mount 22 and still prevent sun glare 14 from entering the vehicle 12. After customization, the sun glare shield 10 is attached to the windshield 52 by the attachment device 26.

Figure 11:
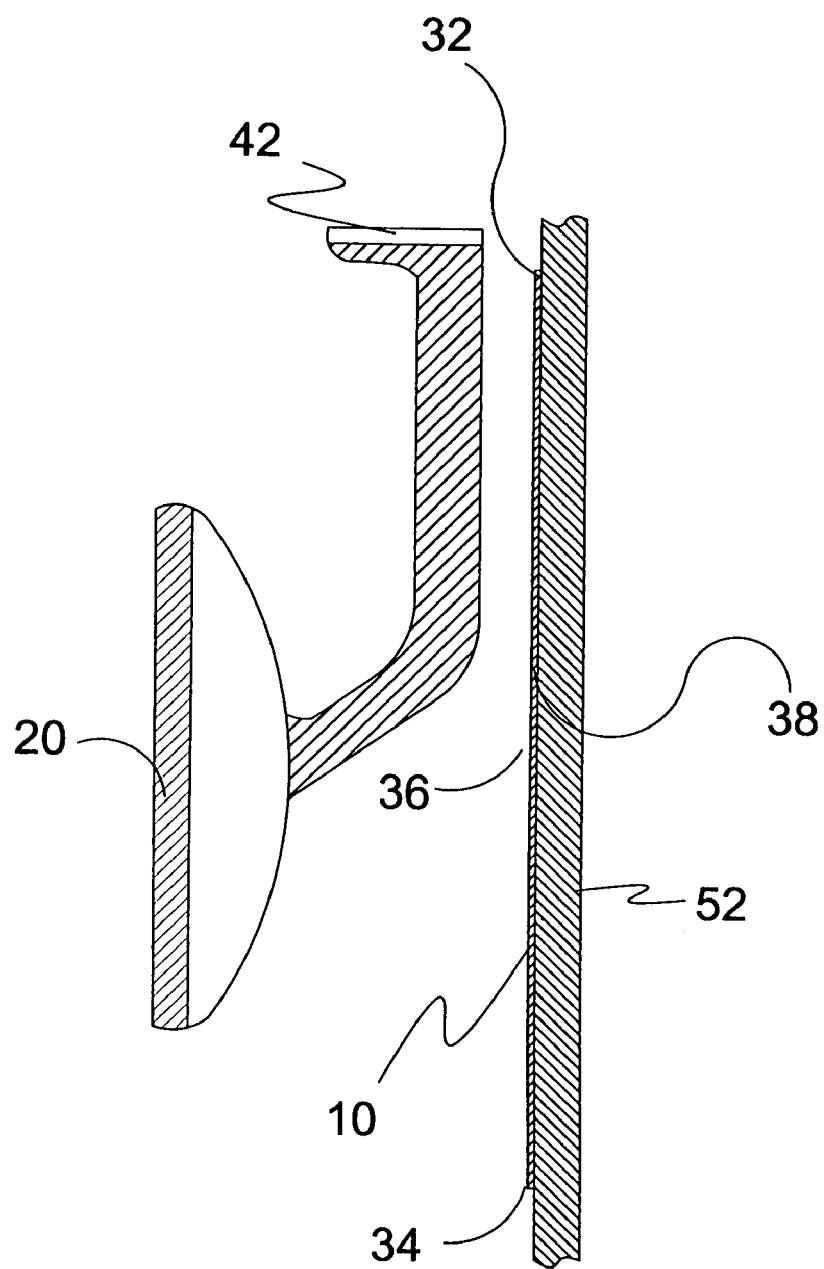
FIG. 11 is a sectional view of the sun glare shield of the present invention without mirror mount interference.

FIG. 11 is a sectional view of the sun glare shield 10 of the present invention. The sun glare shield 10 includes the left 28, right 30, top 32, bottom 34, front 36 and back side 38. The sun glare shield 10 is made from an opaque material, including but not limited to a vinyl, that prevents sun glare 14 from passing therethrough. The vertical line 40 is centrally located on the front 36 of the sun glare shield 10. The vertical line 40 extends from the bottom 34 of the sun glare shield 10 to a location proximate to the top 32 of the sun glare shield 10.

Herein the rear view mirror 20 is attached to the overhead mirror mount 42. Because the overhead mirror mount 42 extends from the roof of the vehicle 12 instead of the windshield 52, the sun glare shield 10 does not have to be customized to fit around overhead mirror mount 42. Rather, the sun glare shield 10 can be directly attached to the windshield 52 by the attachment device 26 without alteration. However, the vertical line 40 can still be used as a guide to center the sun glare shield 10 behind the mirror 20.

Figure 12:
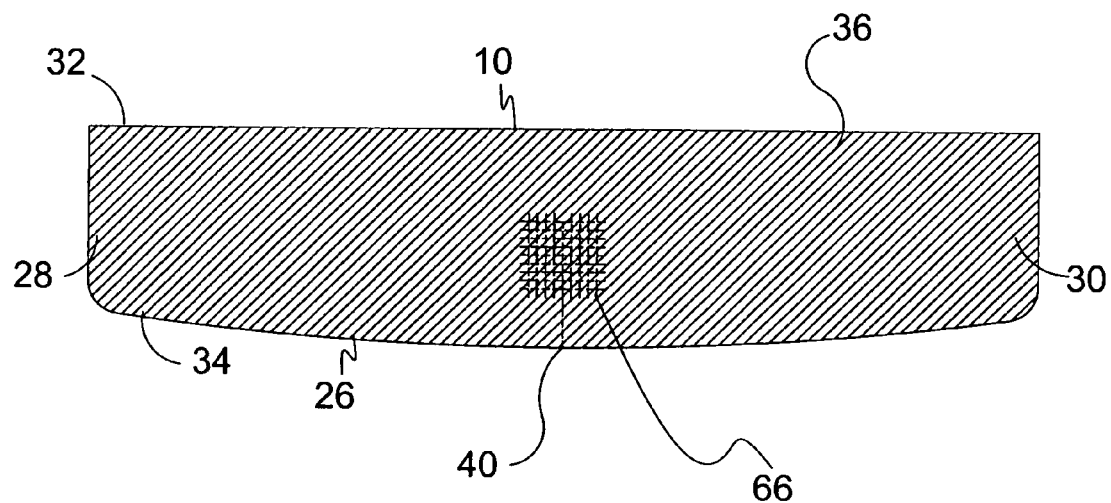
FIG. 12 is an alternate view of the sun glare shield of the present invention.

FIG. 12 is a perspective view of an alternate embodiment of the sun glare shield 10 of the present invention. The sun glare shield 10 includes the left 28, right 30, top 32, bottom 34, front 36 and back side 38. The sun glare shield 10 is made from an opaque material, including but not limited to a vinyl, that prevents sun glare 14 from passing therethrough. The vertical line 40 is centrally located on the front 36 of the sun glare shield 10. The vertical line 40 extends from the bottom 34 of the sun glare shield 10 to a location proximate to the top 32 of the sun glare shield 10. In the embodiment shown herein, instead of the user creating a defined cut template 46 as described in FIG. 8, a predefined template 66 is already marked out on the front 36 of the sun glare shield 10. The predefined template 66 can be one of printed onto the surface of the front 36 of the sun glare shield 10 or can be partially embedded within the surface of the front 36 of the sun glare shield 10. In an alternate embodiment, the predefined template 66 can be located solely on or within the surface of the back 38 of the sun glare shield 10. In another alternate embodiment, the predefined template 66 can be located on or within both the surface of the front 36 and the back 38 of the sun glare shield 10. The user 24 uses the cutting means 44 to cut out the predefined template 66, thereby creating the mirror aperture 50. The mirror aperture 50 allows the sun glare shield 10 to fit around the rear view mirror mount 22 and still prevent sun glare 14 from entering the vehicle 12. After customization, the sun glare shield 10 is attached to the windshield 52 by the attachment device 26.

Figure 13:
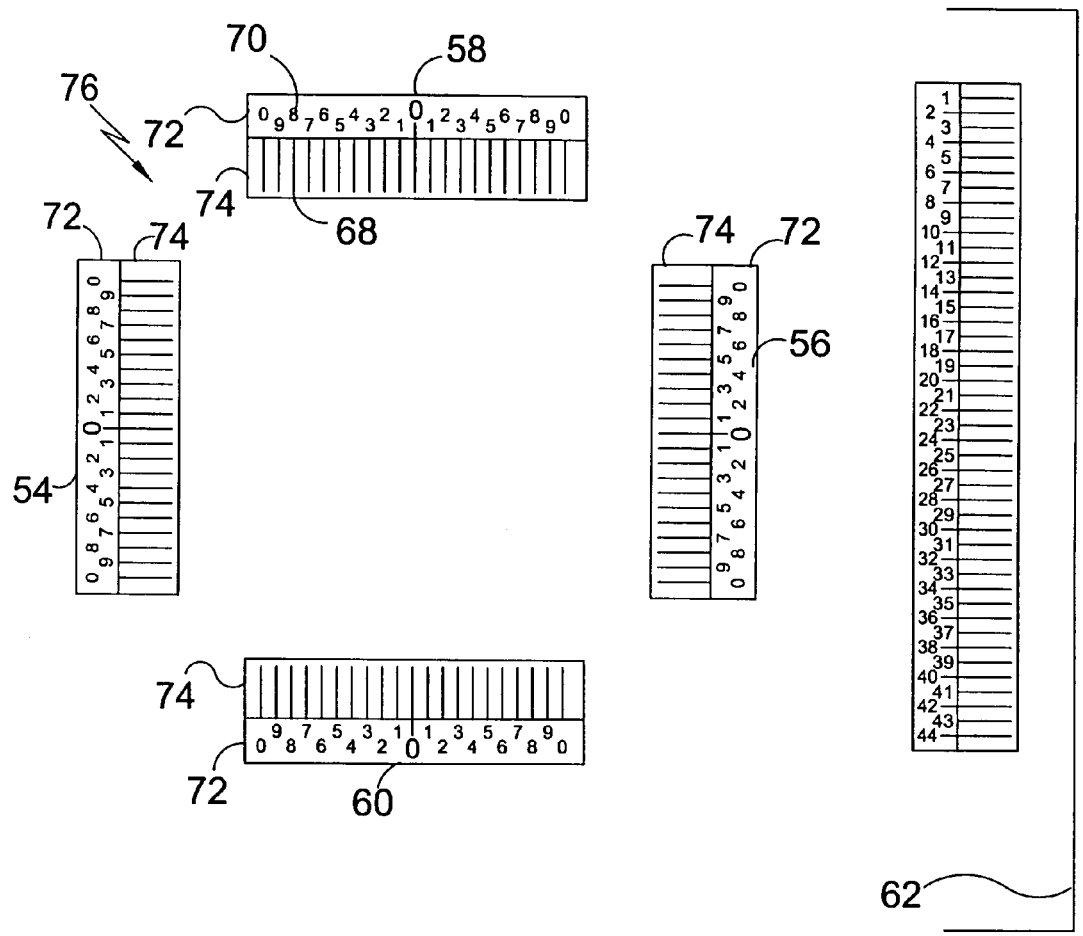
FIG. 13 is a perspective view of the grid measuring devices of the sun glare shield of the present invention.

FIG. 13 is a perspective view of a grid measuring device 76 of the sun glare shield 10 of the present invention. The grid measuring device 76 includes a left side grid 54, a right side grid 56, a top side grid 58, a bottom side grid 60, and a grid marker 62. Herein each grid side 54, 56, 58 and 60 is rectangular in shape. However, the grid sides 54, 56, 58 and 60 can be of any geometric shape that aids in customizing the sun glare shield 10 to fit around the rear view mirror mount 22. Each grid side 54, 56, 58 and 60 includes a top half 72 and a bottom half 74. The bottom half 74 includes a plurality of evenly spaced vertical grid lines 68. The top half 72 has a plurality of grid line numbers 70 where each number 70 corresponds to a grid line 68. The grid line number 70 above the central grid line 68 is a "0," and the grid line numbers 70 increase on both sides of the "0" in increments of one such that the grid line numbers 70 on one side of the "0" are a mirror image of the grid line numbers 70 on the second side of the "0."

The grid sides 54, 56, 58 and 60 are placed around the rear view mirror mount 22 with the "0"s creating a center line with the rear view mirror mount 22. The grid sides 54, 56, 58 and 60 allow the user 24 to easily determine the width and height of the rear view mirror mount 22. These measurements are in turn transferred to the sun glare shield 10 such that they form the user defined cut template 46 discussed hereinabove with specific reference to FIG. 8. The user defined cut template 46 is a template for creating the mirror aperture 50 such that the sun glare shield 50 is customized to fit around the rear view mirror mount 22 and prevents sun glare 14 from entering the line of vision of the user 24.

Figure 14:
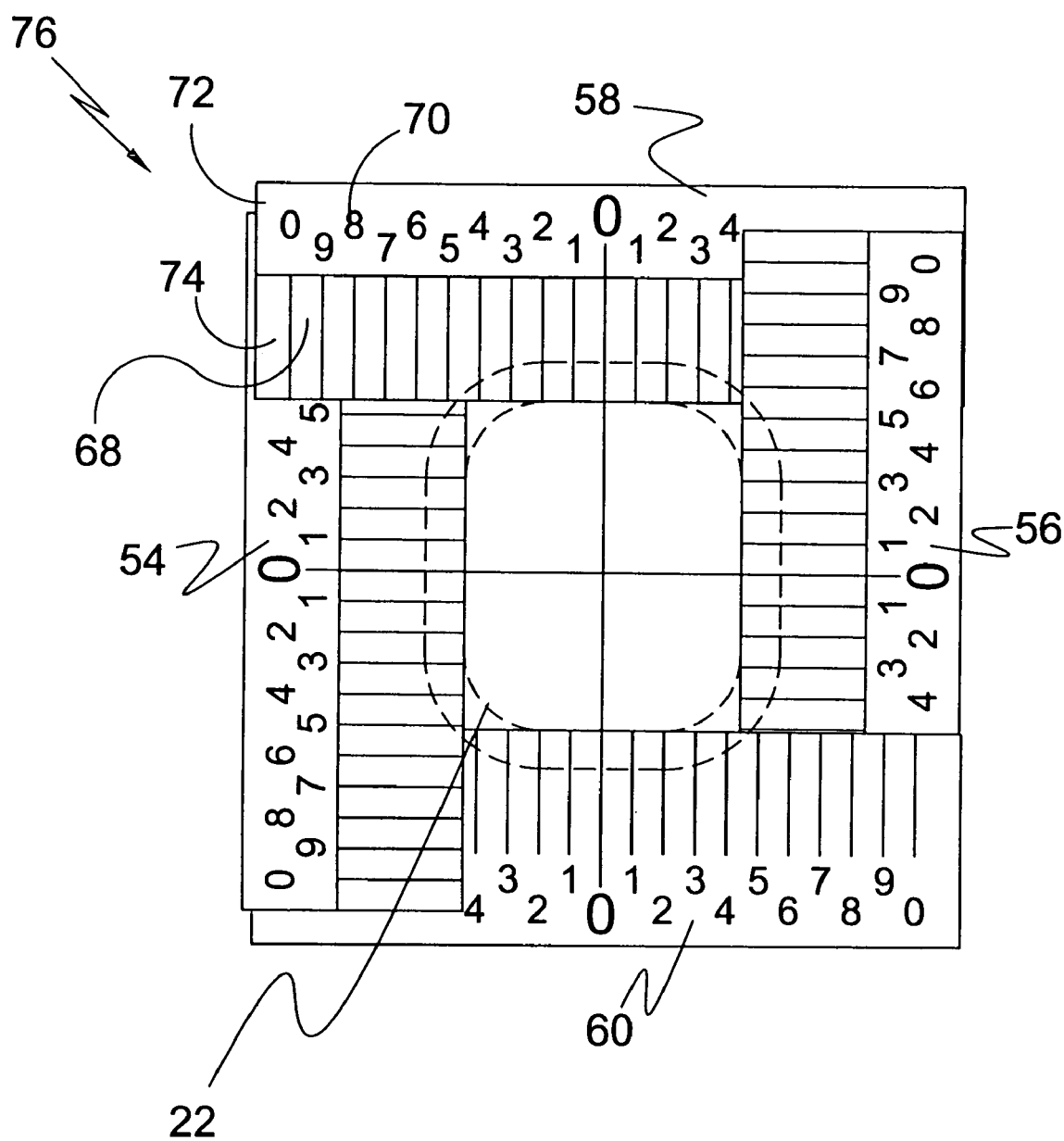
FIG. 14 is an illustrative view of the grid measuring device of the sun glare shield of the present invention.

FIG. 14 is an illustrative view of the grid measuring device 76 of the sun glare shield 10 of the present invention. The grid measuring device 76 includes the left side grid 54, the right side grid 56, the top side grid 58, the bottom side grid 60, and the grid marker 62. Herein each grid side 54, 56, 58 and 60 is rectangular in shape. Each grid side 54, 56, 58 and 60 includes the top half 72 and the bottom half 74. The bottom half 74 has the plurality of evenly spaced vertical grid lines 68 thereon. The top half 72 has the plurality of grid line numbers 70 thereon, where each number 70 corresponds to a grid line 68. The grid line number 70 above the central grid line 68 is a "0," and the grid line numbers 70 increase on both sides of the "0" in increments of one such that the grid line numbers 70 on one side of the "0" are a mirror image of the grid line numbers 70 on the second side of the "0."

The left side grid 54 is placed alongside of the left side of the rear view mirror mount 22, with the grid lines 68 flush against the left side of the rear view mirror mount 22 and the "0" centered along the left side of the rear view mirror mount 22. The right side grid 56 is applied to the right side of the rear view mirror mount 22, with the grid lines 68 flush against the right side of the rear view mirror mount 22 and the "0" centered along the right side of the rear view mirror mount 22. The top side grid 58 is applied to the top side of the rear view mirror mount 22, with the grid lines 68 flush against the top side of the rear view mirror mount 22 and the "0" centered along the top side of the rear view mirror mount 22. The bottom side grid 60 is applied to the bottom side of the rear view mirror mount 22, with the grid lines flush against the bottom side of the rear view mirror mount 22 and the "0" centered along the top side of the rear view mirror mount 22. The grid sides 54, 56, 58 and 60 are adjusted around the rear view mirror mount 22 until the grid line numbers 70 are aligned such that grid line numbers 70 on the left side grid 54 are the same as the grid line numbers 70 on the right side grid 56 and the grid line numbers 70 on the top side 58 are the same as the grid line numbers 70 on the bottom side 60. The grid sides 54, 56, 58 and 60 allow the user 24 to easily determine the width and height of the rear view mirror mount 22. These measurements are in turn transferred to the sun glare shield 10 such that they form the user defined cut template 46 discussed hereinabove with specific reference to FIG. 8. The user defined cut template 46 is a template for creating the mirror aperture 50 such that the sun glare shield 50 is customized to fit around the rear view mirror mount 22 and prevents sun glare 14 from entering the line of vision of the user 24.

Figure 15:
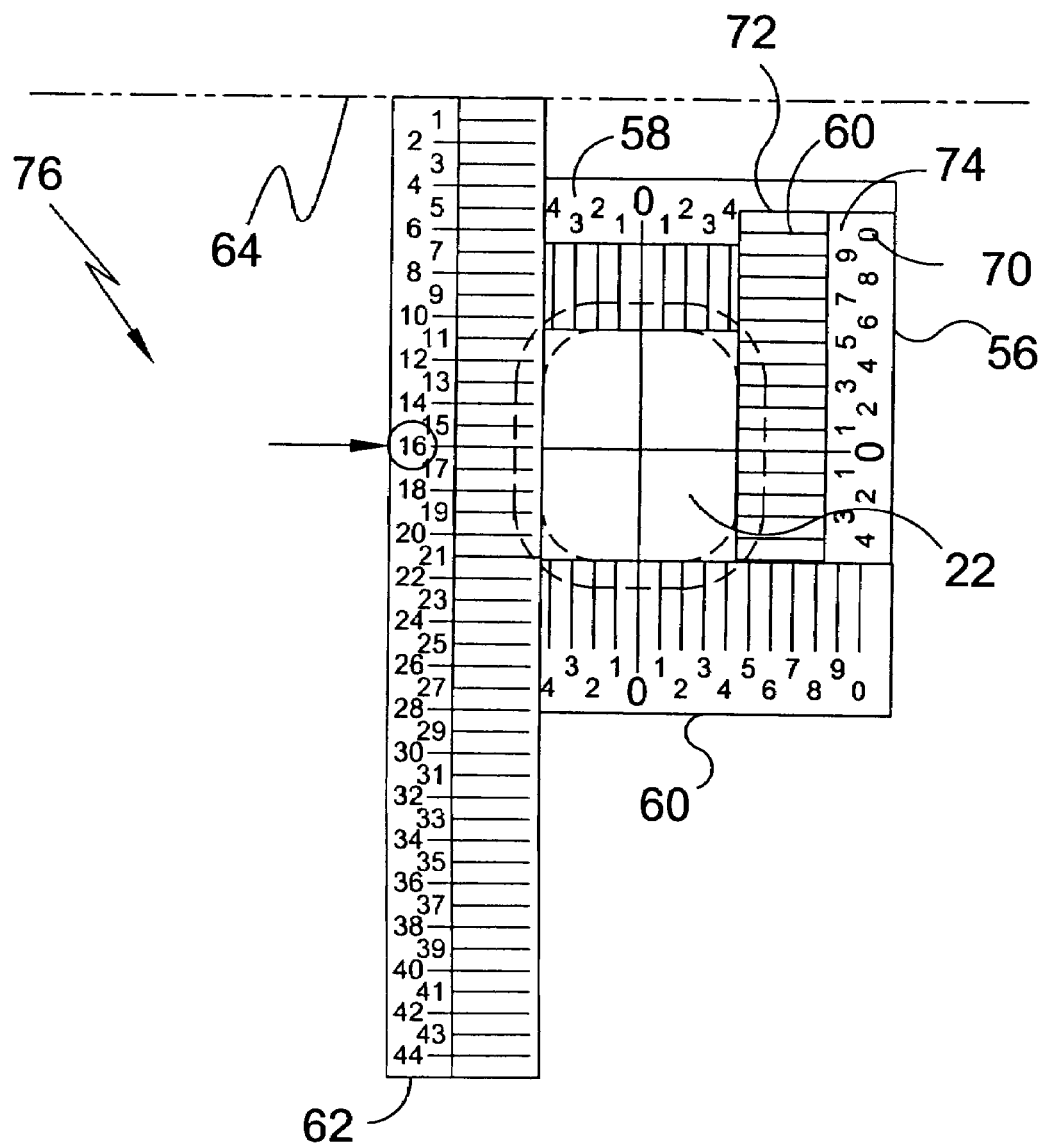
FIG. 15 is an illustrative view of the grid measuring device of the sun glare shield of the present invention.

FIG. 15 is an illustrative view of the grid measuring device 76 of the sun glare shield 10 of the present invention. The grid measuring device 76 includes the left side grid 54, the right side grid 56, the top side grid 58, the bottom side grid 60, and the grid marker 62. Herein each grid side 54, 56, 58 and 60 is rectangular in shape. Each grid side 54, 56, 58 and 60 includes the top half 72 and the bottom half 74. The bottom half 74 has the plurality of evenly spaced vertical grid lines 68 thereon. The top half 72 has the plurality of grid line numbers 70 thereon, where each number 70 corresponds to a grid line 68. The grid line number 70 above the central grid line 68 is a "0," and the grid line numbers 70 increase on both sides of the "0" in increments of one such that the grid line numbers 70 on one side of the "0" are a mirror image of the grid line numbers 70 on the second side of the "0."

The left side grid 54 is placed alongside of the left side of the rear view mirror mount 22, with the grid lines 68 flush against the left side of the rear view mirror mount 22 and the "0" centered along the left side of the rear view mirror mount 22. The right side grid 56 is applied to the right side of the rear view mirror mount 22, with the grid lines 68 flush against the right side of the rear view mirror mount 22 and the "0" centered along the right side of the rear view mirror mount 22. The top side grid 58 is applied to the top side of the rear view mirror mount 22, with the grid lines 68 flush against the top side of the rear view mirror mount 22 and the "0" centered along the top side of the rear view mirror mount 22. The bottom side grid 60 is applied to the bottom side of the rear view mirror mount 22, with the grid lines flush against the bottom side of the rear view mirror mount 22 and the "0" centered along the top side of the rear view mirror mount 22. The grid sides 54, 56, 58 and 60 are adjusted around the rear view mirror mount 22 until the grid line numbers 70 are aligned such that grid line numbers 70 on the left side grid 54 are the same as the grid line numbers 70 on the right side grid 56 and the grid line numbers 70 on the top side 58 are the same as the grid line numbers 70 on the bottom side 60.

The grid sides 54, 56, 58 and 60 allow the user 24 to easily determine the width and height of the rear view mirror mount 22. The grid marker 62 is essentially a ruler. Herein, the grid marker 62 measures the distance from the top 64 of the windshield 52 to the center line "0" of the left side grid 54 to be 16. The user 24 transfers this measurement to the sun glare shield 10 to create the user defined cut template 46, discussed hereinabove with specific reference to FIG. 8. The user defined cut template 46 is a template for creating the mirror aperture 50 such that the sun glare shield 50 is customized to fit around the rear view mirror mount 22 and prevents sun glare 14 from entering the line of vision of the user 24.

It will be understood that each of the elements described above, or two or more together may also find a useful application in other types of devices differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A sun glare shield device comprising:
a shaped member for reducing glare associated with the sun for reducing glare associated with the sun; and
means for attaching said member to at least one of a windshield of a vehicle and a rear view mirror of a vehicle, wherein said member obstructs spaces between a vehicle visor and the rear view mirror and prevents sun glare from passing through said spaces, wherein said member further comprises an attachment guide positioned along vertical axis at substantially a center point of said member for aiding in attaching said member via said attachment means said attachment guide further comprises a grid measuring device for customizing a size of an aperture to be used in positioning said member aground a mount of the rearview mirror.

2. The device as recited in claim 1, wherein said member is formed from at least one of an opaque material and a mesh material.

3. The device as recited in claim 1, wherein said member is formed from a mesh material and provides a one-way field of vision allowing for viewing therethrough while simultaneously preventing sun glare from entering the vehicle compartment.

4. The device as recited in claim 1, wherein said member is electrostaticly charged, and said attaching means is said static electric charge.

5. The device as recited in claim 1, wherein said attachment guide is perforatable and extends from a: bottom edge of said material to said substantially center point of said member.

6. The device as recited in claim 1, wherein said attachment guide further comprises a cutout revealing an aperture, wherein said aperture is of substantially equal size and shape as a mount for mounting said rear view mirror to said windshield.

7. The device as recited in claim 1, wherein said member is polarized for aiding in reducing the sun glare within a passenger compartment of the vehicle.

8. The device as recited in claim 1, wherein said member is substantially rectangular in shape.

9. The device as recited in claim 1, wherein said member has a height that ranges between substantially a height of a rear view mirror and substantially a height a vehicle folddown sun visor.

* * * * *